(12) United States Patent
Venkata et al.

(10) Patent No.: US 9,191,139 B1
(45) Date of Patent: Nov. 17, 2015

(54) SYSTEMS AND METHODS FOR REDUCING THE COMPUTATIONAL RESOURCES FOR CENTRALIZED CONTROL IN A NETWORK

(75) Inventors: Subbaiah Venkata, Sunnyvale, CA (US); Barry Friedman, Sunnyvale, CA (US); Cheng Ee, San Bruno, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/494,821

(22) Filed: Jun. 12, 2012

(51) Int. Cl.
*H04J 11/00* (2006.01)
*H04J 14/00* (2006.01)
*H04L 12/715* (2013.01)
*H04L 12/713* (2013.01)
*H04L 12/721* (2013.01)

(52) U.S. Cl.
CPC ............. *H04J 11/0066* (2013.01); *H04L 45/04* (2013.01); *H04L 45/586* (2013.01); *H04L 45/62* (2013.01)

(58) Field of Classification Search
CPC ................ H04L 12/4641; H04L 12/56; H04L 2012/562; H04L 45/586; H04L 45/04; H04L 45/42; H04L 49/254; H04L 47/781; H04L 11/0066; H04L 45/62; H04L 49/781
USPC .......................................................... 709/238
See application file for complete search history.

(56) References Cited

U.S. PATENT DOCUMENTS

| | | | | |
|---|---|---|---|---|
| 7,877,511 | B1* | 1/2011 | Berger et al. | 709/242 |
| 8,572,281 | B1* | 10/2013 | Jesuraj | 709/238 |
| 2004/0252634 | A1* | 12/2004 | Regan et al. | 370/216 |
| 2005/0083936 | A1* | 4/2005 | Ma | 370/392 |
| 2005/0240994 | A1* | 10/2005 | Burcham et al. | 726/15 |
| 2010/0030839 | A1* | 2/2010 | Ceragioli et al. | 709/201 |
| 2011/0238816 | A1* | 9/2011 | Vohra et al. | 709/224 |
| 2013/0071116 | A1* | 3/2013 | Ong | 398/45 |

* cited by examiner

*Primary Examiner* — Brian J Gillis
*Assistant Examiner* — Juan C Turriate Gastulo
(74) *Attorney, Agent, or Firm* — Edward A. Gordon; Foley & Lardner LLP

(57) ABSTRACT

A network system that reduces the computational resources to centrally-control network nodes in a border gateway protocol (BGP) network. More particularly, the systems and methods describe the control of a plurality of individual network nodes by a centralized controller, and the use of a route control server (RCS), which is connected to the centralized controller, or OpenFlow Controller (OFC). By treating the plurality of individual network nodes as a single combined network node, the route control server is able communicate using a single BGP speaker, and hence, reduce the computational resources from that required to run an individual BGP speaker for each individual network node.

27 Claims, 7 Drawing Sheets

SYSTEMS AND METHODS FOR REDUCING THE COMPUTATIONAL RESOURCES FOR CENTRALIZED CONTROL IN A NETWORK

TECHNICAL FIELD

The systems and methods described herein relate to network systems, and more particularly, to systems and methods that reduce computational resources to centrally control a network that uses a routing protocol, such as border gateway protocol.

BACKGROUND

A network system comprises the hardware and supporting software necessary to direct information between computers. The network itself may be a shared local area network (LAN), wide area network (WAN), metropolitan area network (MAN), the Internet, or any other type of network or communication system suitable for transferring information between computer systems. Network hardware may comprise switches, used to connect computers on a common network, and routers, used to make interconnections between networks, where the collection of computers, switches, routers, and other devices used in a network environment, can be referred to as network nodes.

A network, or a group of networks, using common administration, and with a common routing policy, is known as an autonomous system. Facilitating the transfer of information on a network between, or within, an autonomous system are communication protocols. The internet protocol suite (TCP/IP) is a set of such communication protocols used for internet communication.

TCP/IP is divided into four layers; the border gateway protocol (BGP) is an application layer protocol, and the protocol commonly used between internet service providers (ISPs). BGP can be described as a protocol that advertises reachability information between autonomous systems to determine routes to networks.

The operation of network hardware, such as switches and routers, can be conceptually divided between a data-plane and a control-plane, where the data-plane comprises the physical hardware necessary to forward data packets through the piece of network hardware. The control-plane, in contrast, comprises the software that analyzes data packets arriving at, for example, a switch port, and decides what actions should be taken in response to the data packet's arrival. The control-plane maintains a routing table, listing all network addresses reachable from the given switch, and instructs the data-plane as to how to forward the packet.

A centrally-controlled network, or software-defined network, as recited by OpenFlow (openflow.org), is a methodology that allows for centralized control of a large network of hardware. The control-plane is removed from the individual switches and routers, and replaced by an OpenFlow agent that allows for remote control from a centralized control server, or centralized controller. An OpenFlow switch, for example, primarily consists of three parts, a flow table, which informs the switch as to how to process incoming packets, a secure channel that connects to the global control-plane, and the OpenFlow protocol to enable the centralized control server to communicate with the switch.

BGP can connect multiple autonomous systems running any kind of internal routing protocol. It is agnostic to the internal workings of an autonomous system, and only requires that at least one of the routers in the autonomous system runs the BGP protocol, wherein this router runs a protocol processor which is, in this implementation, a BGP speaker, and wherein BGP normally has one BGP speaker representing one switching node or router. A centrally-controlled network aims to allow a single, centralized controller to control a large number of switching nodes. Conventional BGP methods present a problem for centralized control, however, since a centralized controller has to run a BGP speaker for each centrally-controlled switching node or router, which may be computationally expensive and impractical for a large number of switching nodes or routers controlled by a single centralized controller.

As such, there is a need for a more efficient method for accommodating centralized control in a BGP network.

SUMMARY

The systems and methods described herein include, among other things, a network system that reduces the computational resources employed to centrally-control network nodes in a network that uses a routing protocol. More particularly, the system controls a plurality of individual network nodes from a centralized controller, wherein the centralized controller, or OpenFlow Controller (OFC), is connected to a route control server (RCS). By treating multiple individual network nodes as a single combined network node, the route control server is able to communicate using a single or limited number of instances of a protocol processor, and hence, reduce the computational resources from that required to run a single instance of a protocol processor for each individual network node controlled from a centralized controller.

In another implementation, the system may use border gateway protocol as its routing protocol.

The system may use a single or limited number of BGP speaker instances as the protocol processor, thereby reducing the computational resources required to centrally-control the network nodes from the centralized controller.

In another implementation, the system may use the intermediate system to intermediate system (IS-IS) routing protocol.

The system may also use the open shortest path first (OSPF) protocol.

In certain implementations, the routing protocol may be routing information protocol (RIP).

Optionally, the system may use the address resolution protocol (ARP) routing protocol.

The system may have a global routing table for storing routes that treat the individual network nodes as a combined network node.

In another implementation, a next hop map lists all the next hop network addresses associated with each network node.

The system may include a local route processor, for breaking down the global routing table into routes associated with individual network nodes.

Certain implementations of the system may have a local routing table for each network node.

The system may have a filter that stores network addresses that are unreachable from an individual network node, and for removing an unreachable network node from the combined network node before advertising routes which may result in black-holing of traffic.

The network nodes used with the system may be network switches.

Optionally, the network nodes used with the system may be network routers.

The system may have a multiplexer in a route control server for communicating with the centralized controller using a single TCP session.

The system may optionally have an RCS table allowing a centralized controller to use more than one route control server.

In another aspect, the systems and methods described herein include a method for centrally controlling a plurality of individual network nodes in a network that uses a routing protocol, and the method includes communicating control information between network nodes using a centralized controller. The plurality of individual network nodes are grouped into a combined network node using a route control server that maps ports on individual network nodes to ports on the combined network node. The combined network node may then communicate with other network peers using a single instance of a protocol processor, where before a single instance of the protocol processor would have been required for each individual network node. This results in reduced computational resource requirements to control the plurality of individual network nodes.

BRIEF DESCRIPTION OF THE DRAWINGS

The systems and methods described herein are set forth in the appended claims. However, for purpose of explanation, several embodiments are set forth in the following figures.

DETAILED DESCRIPTION

Figure 1:
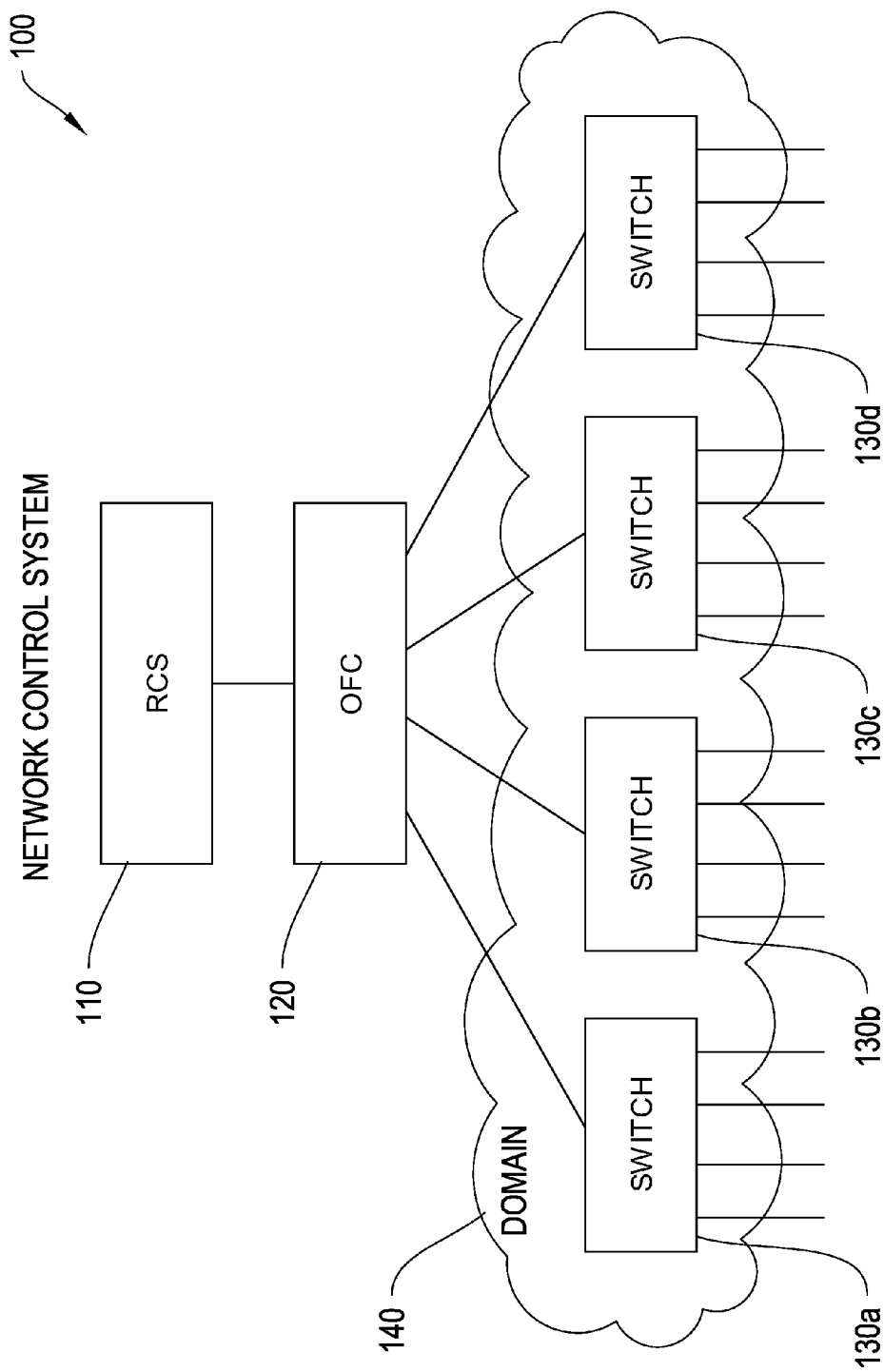
FIG. 1 is a schematic block diagram of one BGP network environment in which some embodiments operate.

In the following description, numerous details are set forth for purpose of explanation. However, one of ordinary skill in the art will realize that the embodiments described herein may be practiced without the use of these specific details, which are not essential and may be removed or modified to best suit the application being addressed. In other instances, well-known structures and devices are shown in block diagram form to not obscure the description with unnecessary detail.

In one embodiment, the systems and methods described herein include, among other things, a network system that reduces the computational resources employed to centrally-control network nodes in a border gateway protocol (BGP) network. More particularly, the systems and methods describe the control of a plurality of individual network nodes by a centralized controller, and the use of a route control server (RCS), which is connected to the centralized controller, typically an OpenFlow Controller (OFC).

The RCS treats the plurality of individual network nodes as a single network node, such that for a plurality of individual network switches, the RCS advertises to other devices on the BGP network, otherwise referred to as peers, that it represents a single switch, otherwise referred to as a single virtual switch, and wherein the RCS maps ports on individual switches to ports on the single virtual switch, hence the number of switch ports of the single virtual switch is equal to the sum of the ports of the plurality of individual network switches. By advertising, the RCS is broadcasting that the single virtual switch it represents is able to reach certain BGP network destinations (IP addresses), wherein the routes to these network destinations for the single virtual switch are stored in the RCS in a global routing table.

In response to advertisements of network routes, other BGP peers, which may be other BGP-enabled switches, route network traffic through the single virtual switch to network destinations previously advertised. In reality, network traffic routed through the single virtual switch arrives at an individual switch. The route to the destination is stored in a local routing table in the individual switch, wherein the local routing table is constructed by breaking up the global routing table into next-hop network addresses associated with individual switches, wherein a list of next hop addresses associated with each individual switch are stored in a next hop map in the RCS.

Generally, by treating a plurality of individual network nodes as a single combined network node, the route control server is able communicate using a single protocol processor, wherein a protocol processor facilitates communication using the syntax of a given routing or reachability protocol, and wherein a BGP speaker is an example of a protocol processor. By using a single protocol processor, or BGP speaker, the route control server is able to reduce the computational resources from that required to run an individual BGP speaker for each individual network node.

BGP is a routing protocol used between autonomous systems (AS) to exchange reachability information for network destinations within an AS, wherein a network destination may be a client computer, or server computer, among others. Reachability information for a given network destination is essentially an IP address of the next network node that network traffic has to pass through in order to reach the network destination, wherein the next network node address is otherwise referred to as a next hop address. This methodology allows a BGP network to advertise reachability information as a pairing of a destination IP address and an advertiser IP address and allows a peer node in receipt of the advertisement to interpret that in order to get to the advertised destination, network traffic should be directed to the advertiser IP address. It is further noted that BGP is just one example of a protocol that advertises reachability, and the systems and methods described herein may be used with other protocols, including an Intermediate System to Intermediate System (IS-IS) routing protocol, an Open Shortest Path First (OSPF) protocol, a Routing Information Protocol (RIP), and Address Resolution Protocol (ARP), among others. Instead of a single instance of a BGP speaker in an RCS (which is described in further detail in relation to FIG. 3), the systems and methods described herein may be adapted to use a single or limited number of instances of a protocol processor associated with another routing protocol; such as ISIS, OSPF, RIP, or ARP. Accordingly, it will be apparent to those of skill in the art that the systems and methods described herein should not be limited to BGP, and BGP is merely one of a plurality of protocols with which the various implementations may be used.

A BGP advertisement may include a plurality of destinations that are reachable from a given BGP network node, and broadcasted as data packets addressed to all directly-connected BGP peers.

In order to reach a network destination within an autonomous system, the BGP network passes data packets to an autonomous system router running a BGP speaker, otherwise referred to as a border router, wherein the border router can translate between the border gateway protocol, and the internal routing protocol used within the autonomous system.

FIG. 1 is a schematic block diagram of a network control system for centrally-controlling network nodes which may be used in a BGP network environment in which some embodiments operate. In particular, FIG. 1 shows a network control system 100, having a route control server (RCS) 110, a centralized controller 120, in this case an OpenFlow controller (OFC) 120, domain 140, and four switches 130a-130d. Note that the four switches 130a-130d run BGP, and are, in this instance, predominantly similar to one another, but need not be, and may also represent a much larger array of switches. It will also be noted that the depicted implementation should not be limited to switches, and other types of network nodes may be employed, such as routers. The group of network nodes controlled by an OpenFlow controller, such as OFC 120, is, in this implementation, referred to as a domain 140.

Broadly, FIG. 1 depicts a plurality of network nodes, in this instance four switches 130a-130d, controlled by an OFC 120, wherein the switches 130a-130d may be integrated into a BGP network using an RCS 110.

The network control system 100 represents a centrally-controlled, or software-defined network, and may use the OpenFlow network protocol (openflow.org), whereby a centralized controller, such as OFC 120, replaces the control-plane of a network switch (130a-130d). In this implementation, a RCS 110 runs on top of the OFC 120, like an application running on an operating system, however the RCS 110 may optionally run on a separate server to the OFC 120, and multiplexing over a single transmission control protocol (TCP) session may be employed to communicate between the RCS 110 and OFC 120.

FIG. 1 depicts four switches, 130a-130d, and wherein the four depicted switches (130a-130d) represent what may be a larger array of up to perhaps sixty-four switches. To use these switches in a BGP network, they run a BGP instance, or BGP speaker. However, a centralized controller, such as OFC 120, with its limited computational resources, may not be able to run a separate BGP speaker for each centrally-controlled switch (130a-130d). The OFC 120 can reduce the computational power and resources required to control a plurality of switches 130a-130d, by treating the domain 140 of switches 130a-130d as a single virtual switch with many interfaces, wherein the single virtual switch port number is equal to the sum of the ports of the individual switches 130a-130d that make up the single virtual switch. In this way, the OFC 120 can run a single, or limited number of BGP instances (speakers), using an RCS 110.

Figure 2:
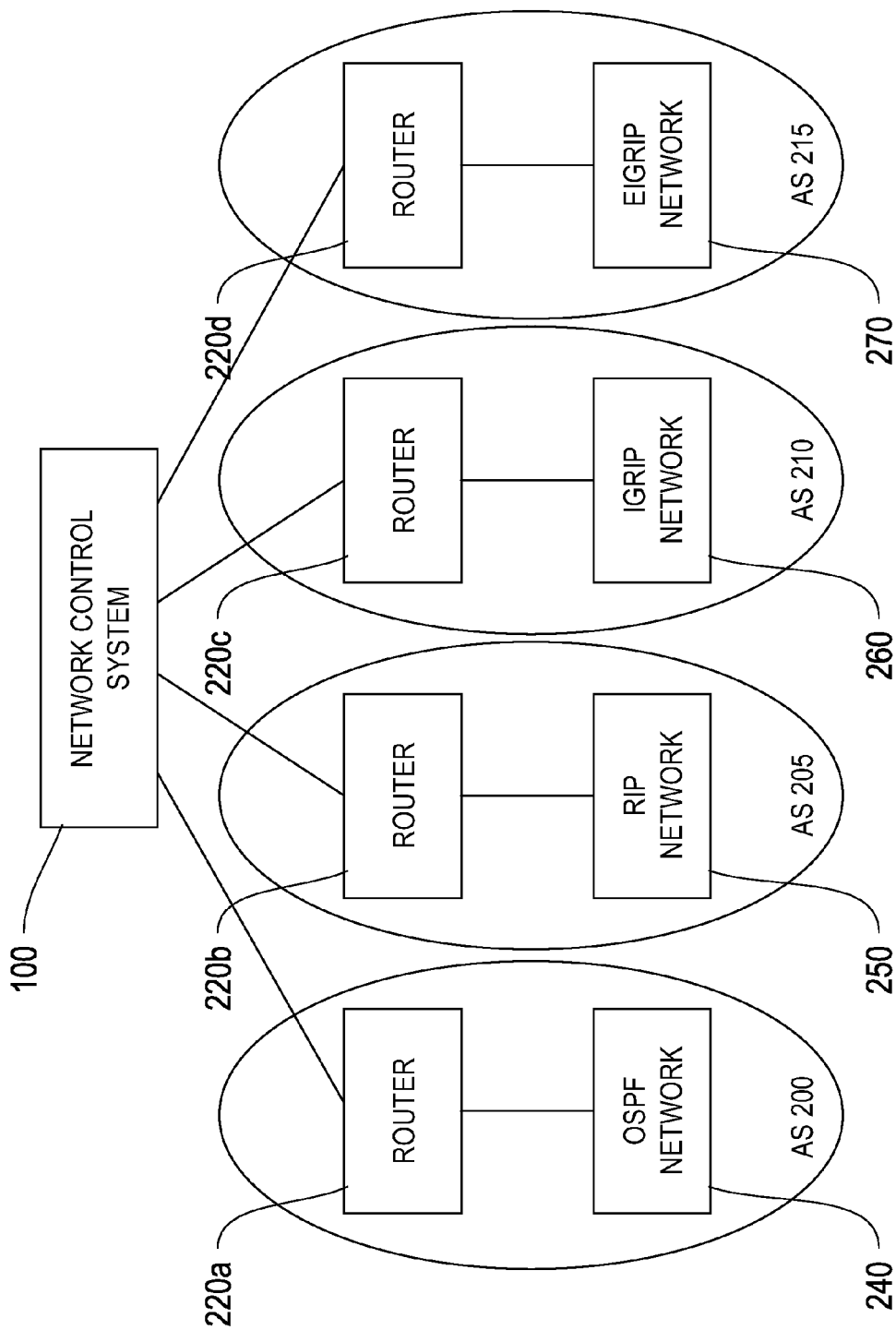
FIG. 2 is a schematic block diagram of four autonomous systems connected to a BGP network.

FIG. 2 is a schematic block diagram of four autonomous systems connected to a BGP network. More particularly, FIG. 2 depicts a network control system 100 from FIG. 1, and four autonomous systems AS 200, AS 205, AS 210, and AS 215. Within the autonomous systems AS 200, AS 205, AS 210, and AS 215 are four respective BGP-enabled routers 220a, 220b, 220c, and 220d, wherein the routers 220a-220d connect the control system 100 to the networks within the four respective autonomous systems AS 200, AS 205, AS 210, and AS 215.

Autonomous systems AS 200, AS 205, AS 210, and AS 215 have networks which may run different routing protocols, including an Open Shortest Path First (OSPF) network 240, a Routing Information Protocol (RIP) network 250, an Interior Gateway Routing Protocol (IGRP) network 260, and an Enhanced Interior Gateway Routing Protocol (EIGRP) network 270. It is noted that while the depicted autonomous systems AS 200, AS 205, AS 210, and AS 215, include a single network, they may contain a plurality of networks each using the respective autonomous system network protocol.

To establish communication between an autonomous system and an inter-autonomous system BGP network, at least one router must run BGP, wherein the router is referred to as a BGP speaker, or border router, and router 220a is the BGP speaker for AS 200, router 220b for AS 205, router 220c for AS 210, and router 220d for AS 215.

Broadly, FIG. 2 illustrates the inter-connection between a plurality of autonomous systems AS 200, AS 205, AS 210, and AS 215, wherein the inter-connection is made using BGP, and wherein BGP communication is facilitated by a centralized controller running a single BGP speaker in a network control system 100 to reduce the computational requirements in the centralized controller.

Figure 3:
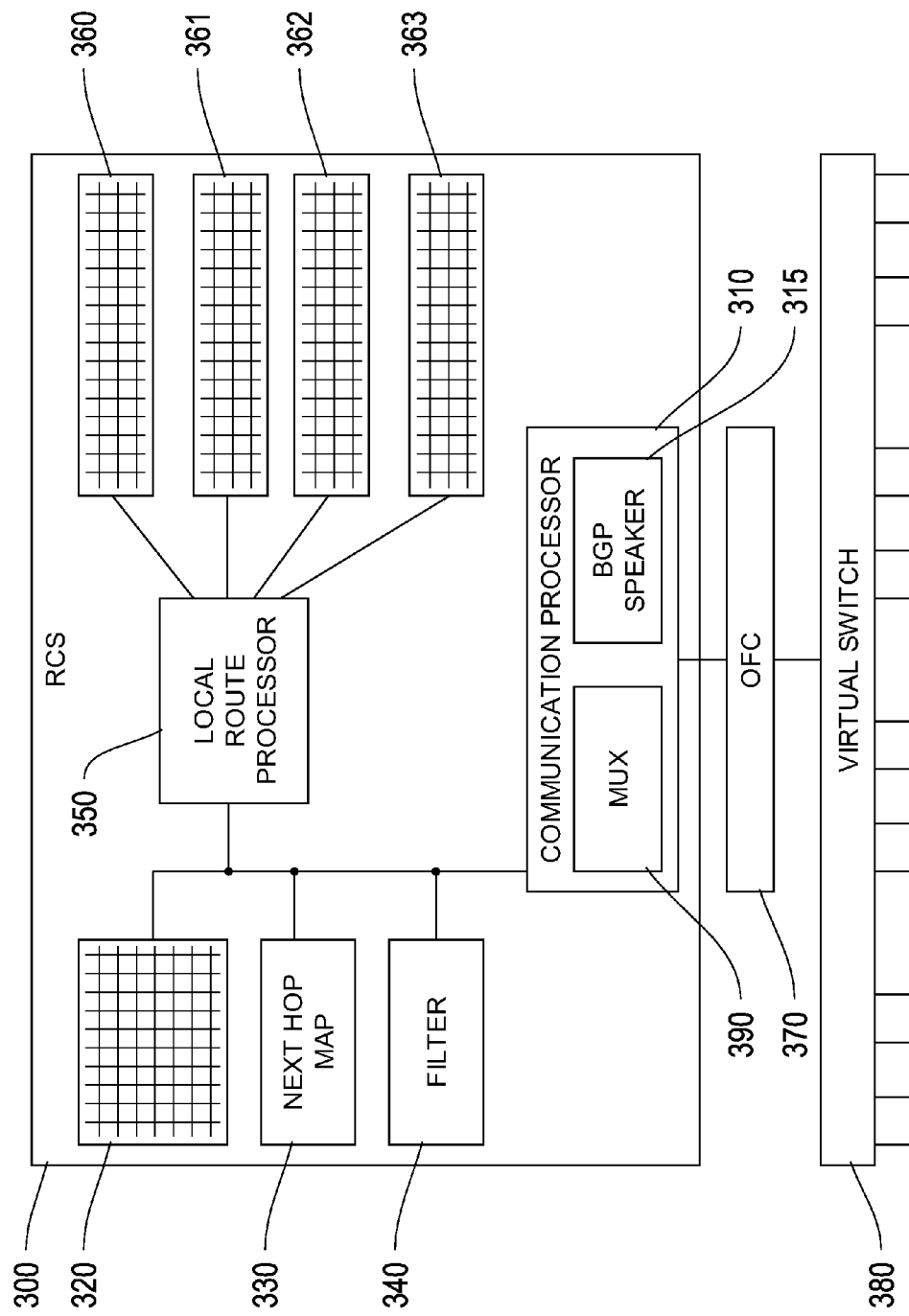
FIG. 3 is a schematic block diagram of a route control server (RCS), which combines a plurality of hardware switches into a single virtual switch.

FIG. 3 is a schematic block diagram of a route control server (RCS) 300, which combines a plurality of hardware switches, such as hardware switches 130a-130d from FIG. 1, into a single virtual switch 380. More particularly, FIG. 3 depicts a communication processor 310, a multiplexer (MUX) 390, a global routing table 320, a next hop map 330, a filter 340, a local route processor 350, four local routing tables 360, 361, 362, 363, a BGP speaker 315, an OFC 370, and a virtual switch 380.

Broadly, FIG. 3 depicts a virtual switch 380 controlled from a single OFC 370 connected to an RCS 300, wherein the virtual switch 380 may be composed of a plurality of individual hardware switches, such as switches 130a-130d from FIG. 1, and wherein instead of using a BGP speaker for each hardware switch 130a-130d, a single BGP speaker 315 represents the virtual switch 380, and thereby reduces the computational resources required by the centralized controller to centrally control the switches 130a-130d.

RCS 300 may be implemented as a separate server, connected to the OFC 370 by a network connection, or optionally, the RCS 300 may be implemented as a process running on the OFC 370 like an application running on an operating system. As such, the various components that make up the RCS 300 may be implemented as purpose-built integrated-circuits (ICs) on separate chips, or in memory controlled by a microcontroller, or combination thereof.

RCS 300 reduces the computational resources needed to centrally-control a plurality of switches in a BGP network by, in one practice, combining a plurality of hardware switches, such as hardware switches 130a-130d from FIG. 1, as a single virtual switch 380, and advertising the virtual switch 380 to peer BGP network nodes, such as the BGP-enabled routers 220a-220d in FIG. 2.

The RCS 300 combines a plurality of hardware switches, 130a-130d, into a single virtual switch 380 by mapping, using the communication processor 310, switch ports on the individual hardware switches 130a-130d to ports on the single virtual switch 380 such that the virtual switch 380 has a number of ports which equals the sum of the ports of the individual hardware switches 130a-130d. Using this mapping, the RCS 300 can treat a plurality of individual hardware switches 130a-130d as a single virtual switch 380 with a single routing table, or global routing table 320. The BGP speaker 315 within the communication processor 310, which is designed to work with a single routing table, uses this global routing table 320 to advertise and store BGP routes. The number of individual hardware switches per RCS 300 is a user-defined limit, whereby a network administrator can decide the number of hardware switches that are to be controlled by a single RCS 300, and the number may be chosen to be less than the limit imposed by computational resources, and may be, for example, sixty-four switches.

Communication processor 310 communicates with the OFC 370, such that data packets can be passed in order to, among other things, map ports on individual hardware switches, such as individual hardware switches 130a-130d, to virtual ports on a virtual switch 380, in addition to advertising BGP routes to, and accepting BGP routes from peer network nodes. The communication processor 310 uses a single BGP speaker 315 to facilitate communication with BGP-enabled peer network nodes, wherein a single BGP speaker 315 is used to correspond to the combined virtual switch 380, and in place of a one-to-one correspondence between BGP speakers and the hardware switches that make up the virtual switch 380. The RCS 300 receives routes in data packets via the OFC 370 in the form:

R<D, Nh_set>

Where R< > is a routing entry that is stored in global routing table 320, D designates the destination of the route, wherein the destination may be the IP address of a network client or server computer, and Nh_set is a set of next hop addresses that lead to the destination, D, of the route, wherein a next hop address is the IP address of a BGP network node, otherwise referred to as a peer, directly-connected to the virtual switch 380, to which data arriving at the virtual switch 380 should be sent to ultimately be routed to destination D.

RCS 300 receives routing entries for the virtual switch 380, such that BGP peers treat a set of hardware switches controlled by the OFC 370, such as hardware switches 130a-130d from FIG. 1, as a single virtual switch 380. Upon receipt of a routing entry, R<>, the RCS 300 stores it in the global routing table 320, indexed, or arranged by destination D.

The communication processor 310 may, in some instances, use a multiplexer 390 to communicate with the OFC 370, whereby data packets are multiplexed between the OFC 370 and RCS 300 across a single TCP session, and such that the RCS 300 and OFC 370 may be implemented on separate server hardware.

As a background process, the OFC 370 will intermittently, or periodically, communicate with the RCS 300 to send updates to the next hop map 330, wherein the next hop map 330 stores, for the hardware switches that make up the virtual switch 380, such as hardware switches 130a-130d from FIG. 1, a list of next hop network addresses reachable from the respective switch, and wherein a next hop map 330 entry has the form:

M<S, Nh_1, Nh_2, Nh_3>

M< > is a next hop map 330 entry for network node (switch) S, and S is one of the hardware switches (130a-130d) that make up the virtual switch 380. Next hop addresses Nh_1, Nh_2, and Nh_3, in the form of IP addresses, are the addresses of BGP-enabled network nodes, or BGP peers, directly connected to switch S, and hence, represent the set of BGP peers reachable from S. Essentially a next hop map 330 serves to list all the possible next hop addresses from a given hardware switch, such as hardware switches 130a-130d from FIG. 1 that make up virtual switch 380.

The RCS 300 breaks down the global routing table 320 into local routing tables corresponding to the hardware switches 130a-130d, that make up the virtual switch 380, wherein local routing tables 360-363 are depicted for four respective hardware switches. A local route processor 350 is used to break up the global routing table 320, wherein the local route processor 350 sequentially, or otherwise, runs through the routing entries, R<>, in the global routing table 320, checks the next hop set, Nh_set, associated with a route entry, and looks in the next hop map 330 to find which of the hardware switches (130a-130d) that make up the virtual switch 380, can reach which of the next hop addresses in the global routing table next hop set, Nh_set. For example, a route from the global routing table 320 for the virtual switch 380 may have the form:

R<D_1, Nh_1, Nh_2, Nh_3>

This route has a destination D_1, and D_1 can be reached by routing through any one of the next hop addresses Nh_1, Nh_2, and Nh_3. The local route processor 350 searches the next hop map 330 for Nh_1, and may find a next hop map entry of the form:

M<S_2, Nh_1, Nh_5, Nh_6>

This next hop map entry describes that, among other next hop addresses (Nh_5, Nh_6), next hop address Nh_1 is reachable by routing through hardware switch S_2, wherein S_2 is one of the switches that forms part of the virtual switch 380, and may be any one of hardware switches 130a-130d. In response, the local route processor 350 writes a local routing table entry into the local routing table associated with S_2, of the form:

R_local<D_1, Nh_1>

This local routing table entry, R_local<>, for switch S_2 describes that destination D_1 is reachable by routing to Nh_1. The local route processor 350 next searches the next hop map 330 for Nh_2, and Nh_3, repeating this process of writing local routes to respective local routing tables 360-363.

Using the next hop map 330 in this way, the RCS 300 can construct local routing tables (360-363) corresponding to hardware switches 130a-130d that make up the virtual switch 380, wherein these local routing tables 360-363 are sent to the OFC 370 to be converted into flow instructions, and wherein a flow instruction is an association of an action with a specific header type. Flows are described by McKeown et al., Open-Flow: Enabling Innovation in Campus Networks (openflow.org, March 2008), to include, but are not limited to; (1) a transmission control protocol (TCP) connection, (2) all the packets from a particular MAC address or IP address, (3) all packets with the same VLAN tag, (4) all packets from the same switch port, or (5) all packets matching a specific header. An action associated with a flow may be (again recited by McKeown et al.): (1) Forwarding a flow's packets to a given port, or ports. (2) Encapsulating and forwarding a flow's packets to a controller. Typically this is used for the first packet in a new flow to allow a controller, such as OFC 370, to decide if the flow should be added to a flow table on a switch (130a-130d). (3) Dropping a flow's packets.

The OFC 370 converts a route in a local routing table (360-363) into flow instructions to be written to flow tables cached in the data-plane of centrally-controlled switches (130a-130d) that make up the virtual switch 380, by associating simple actions with the data packets that match certain header types. Given a local route of the form:

R_local<D_1, Nh_1>

R_local< > is a route associated with a hardware switch (130a-130d), which states that for data packets arriving at a switch (130a-130d) which are ultimately looking for destination D_1, they should be forwarded to next hop address Nh_1. The OFC 370 may construct a flow instruction for this local route which has the form:

F<D_1, P_1>

This flow F< > will be cached in a flow table on the individual switch (130a-130d), and instruct the switch (130a-130d) to pass data packets that have a header with destination D_1 to port P_1, wherein the OFC 370 determined that Nh_1 can be reached by port P_1.

In addition to receiving advertised BGP network routes from peer BGP network nodes, the RCS 300 advertises network destinations that are reachable to peer network nodes via the virtual switch 380. In response to the advertisement of a route, BGP peers will direct network traffic to the virtual switch 380. In reality, a data packet arrives at one of the hardware switches 130a-130d that make up the virtual switch 380. In some instances, the particular hardware switch 130a-130d that receives the data packet is not able to reach the advertised destination, since the route advertisement from the BGP speaker 315 uses the global routing table 320, wherein the assumption is that any destination in the global routing table 320 is reachable from any virtual switch 380 port. In such instances, the data packet is black-holed.

Black-holing, therefore. refers to the RCS 300 advertising a route that has a destination that is reachable only by some of the hardware switches (130a-130d) that make up the virtual switch 380, and in order to prevent black-holing, the RCS 300 may employ a filter 340.

Filter 340 may be used to prevent advertisement of a route, by the RCS 300, which may result in black-holing. The filter 340 may receive instructions from the OFC 370 indicating that a given route to be advertised by the virtual switch 380 may result in black-holing. Within these instructions, the OFC 370 will indicate the hardware switches (130a-130d) that may cause the black-holing. In response, the filter 340 may remove the indicated hardware switches from BGP network communication.

Filter 340 may be used, for example, if internal hardware links associated with a given hardware switch, such as switch 130a from FIG. 1, are non-functional such that the switch 130a is still reachable from external network nodes. In one implementation, internal hardware links may connect from hardware switch 130a to all other network nodes (hardware switches 130b, 130c, and 130d) in a common domain, such as domain 140 from FIG. 1, and external hardware links may connect from switch 130a to other network nodes in other domains. Filter 340 may prevent traffic from an external BGP speaker from being black-holed by identifying the hardware switch 130a with non-functional internal hardware links, and removing that switch from an external-BGP (eBGP) advertisement of routes to peers.

Figure 4:
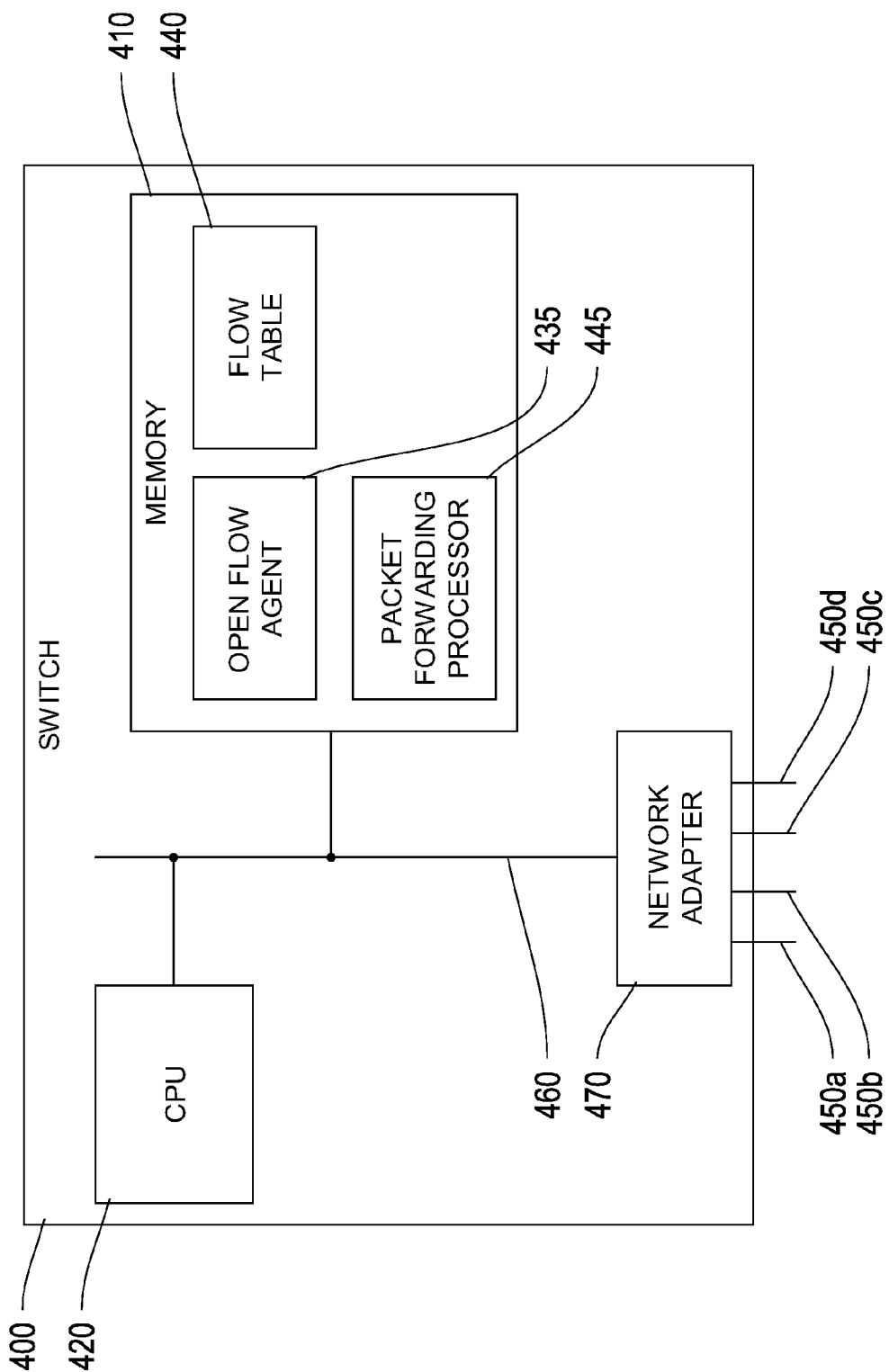
FIG. 4 is a schematic block diagram of a network switch, as used in a centrally-controlled network, and the BGP network of FIG. 1.

FIG. 4 is a schematic block diagram of a network switch 400, of the type used in a centrally-controlled network, such as network control system 100 of FIG. 1. More particularly, FIG. 4 depicts a switch 400, a memory 410, a CPU 420, a network adapter 470, an OpenFlow agent 435, a flow table 440, a packet forwarding processor 445, a data bus 460, and four network hardware interfaces 450a-450d A network switch 400 is essentially a computer, adapted to transmit data between client computers in a network. The switch's 400 actions are governed by a CPU 420, which may represent a plurality of processing cores. The hardware interfaces between the switch 400 and other nodes (switches, routers, controllers, client computers) are accommodated by the network adapter 470, where a network adapter 470 comprises the mechanical, electrical and signaling circuitry to connect the switch 400 to other network nodes. Network adapter 470 may represent a plurality of network adapters, and the four hardware interfaces 450a-450d depicted may represent a larger array of interfaces.

Memory 410 comprises storage locations that are addressable by CPU 420 and adapters for storing software program code and data. The memory 410 may comprise a form of random access memory (RAM) that is generally cleared by a power cycle or other reboot operation (e.g., it is a "volatile" memory). In other embodiments, however, the memory 410 may be a non-volatile memory that does not require power to maintain information. The CPU 420 and adapters may, in turn, comprise processing elements and/or logic circuitry configured to execute the software code and manipulate the data stored in the memory 410.

An OpenFlow agent 435 allows for communication between the switch 400 and a centralized control server, such as OFC 120 from FIG. 1. OpenFlow agent 435 is typically a computer process which receives a data flow to the switch 400. Decisions as to how to process a data flow are made by checking the flow table 440, wherein the flow table 440 stores flow entries that associate a flow with an action. Note that a flow may be defined as multiple different things, as described by McKeown et al., OpenFlow: Enabling Innovation in Campus Networks (openflow.org, March 2008), and including, but not limited to; a transmission control protocol (TCP) connection, all the packets from a particular MAC address or IP address, all packets with the same VLAN tag, all packets from the same switch port, or all packets matching a specific header.

There are three basic actions that a switch adhering to the OpenFlow protocol are to support, as recited by McKeown et al., OpenFlow: Enabling Innovation in Campus Networks (openflow.org, March 2008), and include: (1) Forwarding a flow's packets to a given port, or ports, (2) Encapsulating and forwarding a flow's packets to a controller. Typically this is used for the first packet in a new flow to allow the controller, such as controller OFC 120, to decide if the flow should be added to the flow table 440, and (3) Dropping a flow's packets.

Upon instruction by the controller, such as OFC 120, a new entry can be made in the flow table 440, which associates an action, to be carried out by switch 400, with a given flow. More particularly, a flow entry in the flow table 440 includes three fields; (1) a packet header that defines the flow, (2) an action to be carried out on the packets that make up a flow, and (3) statistics that keep track of the number of packets and bytes for each flow, and the time since the last packet matched the stored flow. This time can be used to remove inactive flows from flow table 440.

FIG. 4 shows a centrally-controlled switch 400, which is similar to switches 130a-130d from FIG. 1, and which may be used by an RCS 300 from FIG. 3 to form a virtual switch, such as virtual switch 380. As part of a virtual switch 380, switch 400 may be used to communicate with BGP peers in a BGP network. FIG. 4 indicates that a switch 400 does not need to have any elements running BGP, and wherein BGP communication is facilitated by a single BGP speaker 315 in an RCS 300.

Figure 5:
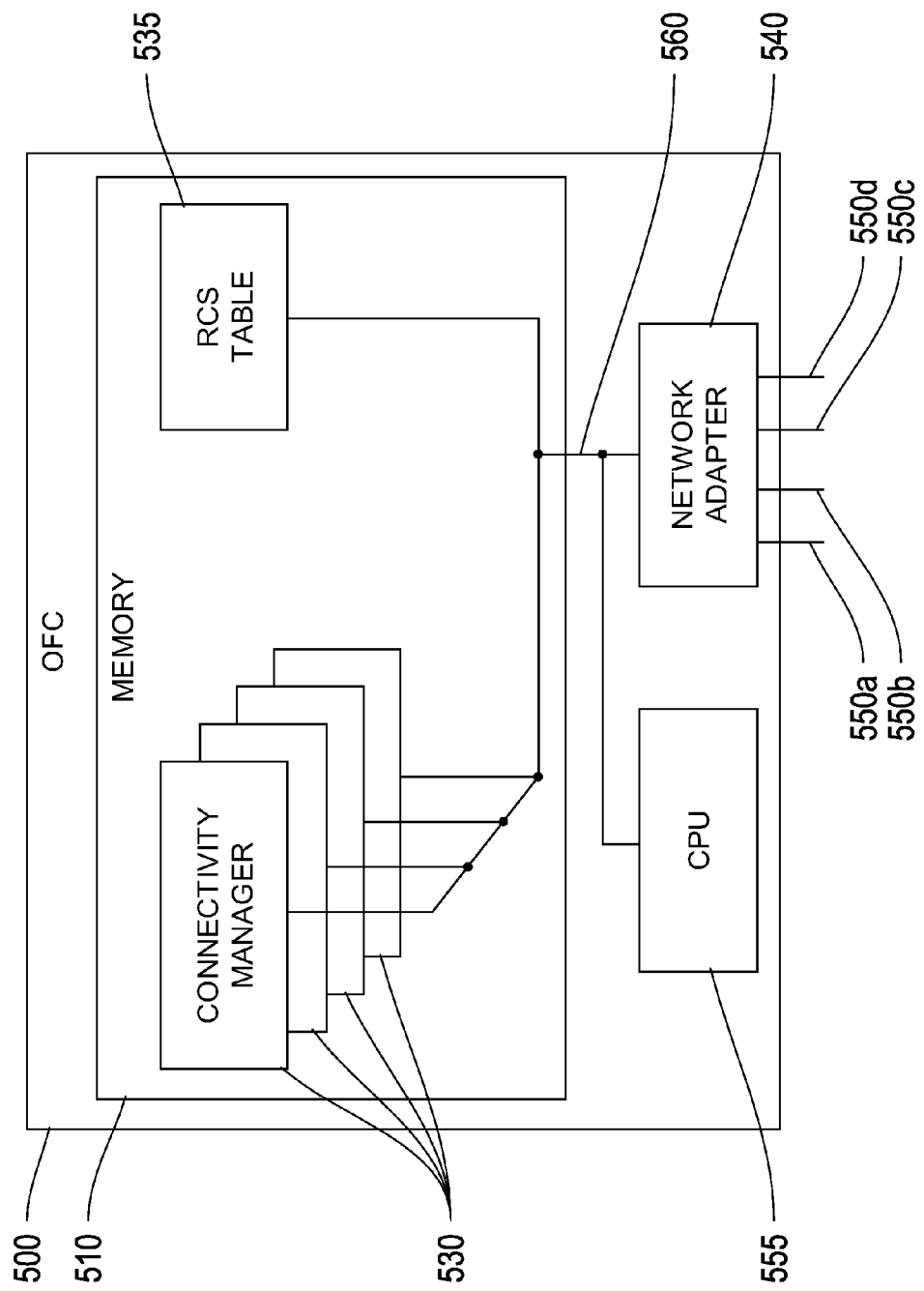
FIG. 5 is a schematic block diagram of a centralized, OpenFlow controller.

FIG. 5 is a schematic block diagram of a centralized, OpenFlow controller. More particularly, FIG. 5 depicts a network adapter 540 with four interfaces 550a-550d, a CPU 555, a memory 510, three connectivity managers 530, and an RCS table 535, interconnected by data bus 560.

An OpenFlow Controller 500 is essentially a server computer, adapted control a plurality of switches within a domain. The OFC's 500 actions are governed by a CPU 555, which may represent a plurality of processing cores. The hardware interfaces between the OFC 500 and other nodes (switches, routers, controllers, client computers) are accommodated by the network adapter 540, where a network adapter 540 comprises the mechanical, electrical and signaling circuitry to connect the OFC 500 to other network nodes. Network adapter 540 may represent a plurality of network adapters, and the four hardware interfaces 550a-550d depicted may represent a larger array of interfaces.

Memory 510 comprises storage locations that are addressable by CPU 555 and adapters for storing software program code and data. The memory 510 may comprise a form of random access memory (RAM) that is generally cleared by a power cycle or other reboot operation (e.g., it is a "volatile" memory). In other embodiments, however, the memory 510 may be a non-volatile memory that does not require power to maintain information. The CPU 555 and adapters may, in turn, comprise processing elements and/or logic circuitry configured to execute the software code and manipulate the data stored in the memory 510.

A connectivity manager 530 implements the OpenFlow protocol necessary for centralized control of a network switch, as recited by OpenFlow.org. The implementation depicted in FIG. 5 includes four connectivity managers 530, wherein this implementation may be used to centrally control four switches, such as switches 130a-130d from FIG. 1. In other implementations, an OFC 500 may include more than, or fewer than four connectivity managers 530, wherein the number may be up to sixty-four, such that a one-to-one correspondence is maintained between instances of a connectivity managers 530 and switches.

In one implementation, the OFC 500 may use one or more route control servers (RCS) to allow an OFC 500 to control a plurality of network nodes within a network using BGP. More than one route control server may be employed where, for instance, a limit to the number of hardware network nodes, depicted as switches in FIG. 1, is reached. This network node per route control server limit may be imposed due to limited computational resources available to the OFC 500, or may, in some instances, be user-defined to allow for redundancy in the OFC 500.

Route control servers may run on the OFC 500 like applications running on an operating system, or may be implemented on separate server hardware to the OFC 500, or a combination thereof. When more than one route control server is used with an OFC 500, wherein the more than one route control servers may or may not be implemented on separate hardware, the OFC 500 maintains an RCS table 535 which may be used to lookup the appropriate route control server to which a data packet received by the OFC 500 should be forwarded to. The RCS table 535 may store a list of hardware switches associated with a specific RCS, such as RCS 300, and forward packets from a given hardware switch to its associated RCS by checking the RCS table 535.

Figure 6:
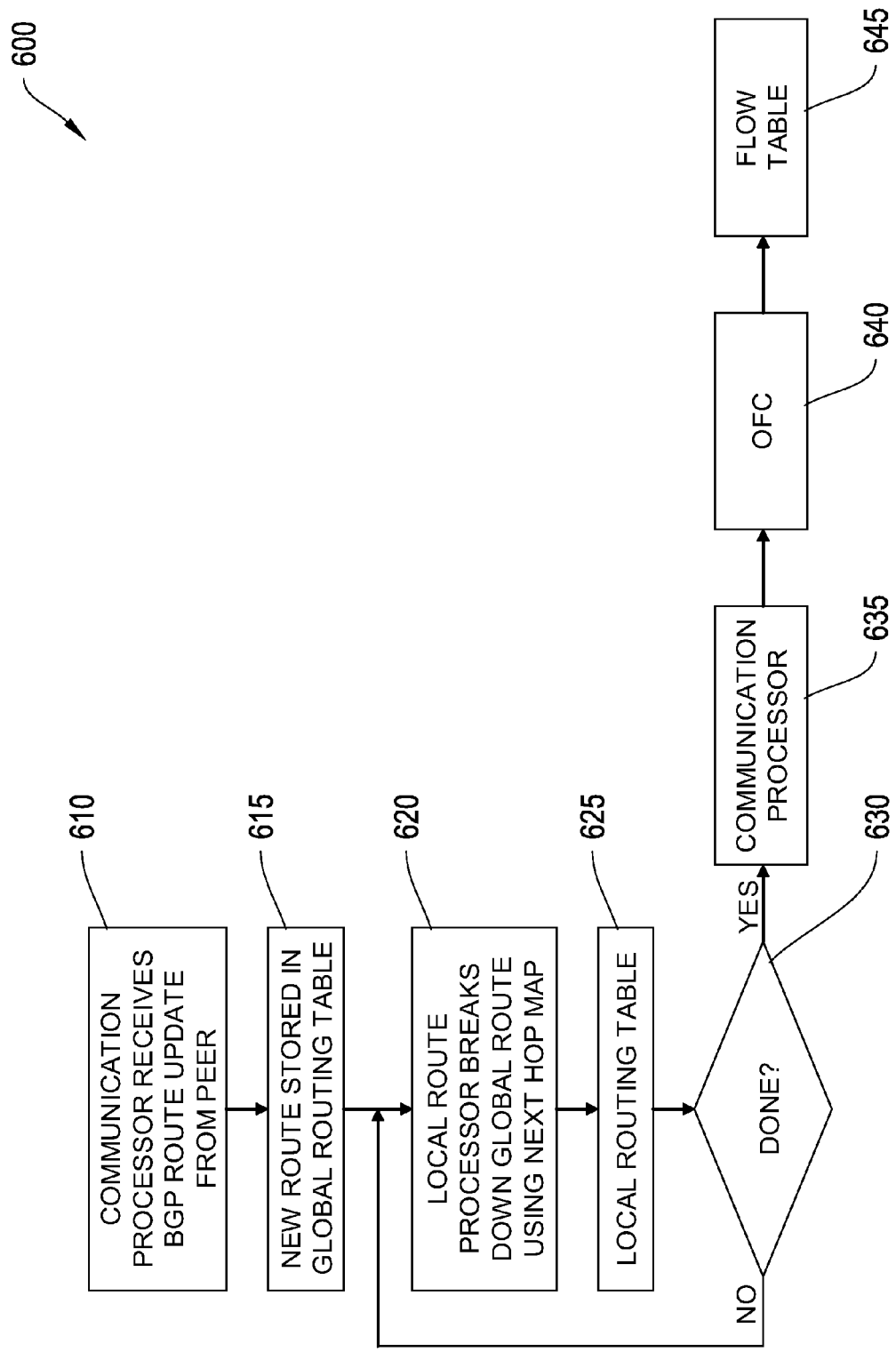
FIG. 6 is a flow chart diagram of a process for receiving an advertised BGP route into the route control server.

FIG. 6 is a flow chart diagram of a process 600 for receiving an advertised BGP route into the route control server and for translating that advertised BGP route into a flow table entry on a network node. The process 600 begins at step 610 with the receipt, by a communication processor in a route control server (RCS), of a BGP route update from a peer network node, wherein the route update includes the virtual switch created by the RCS out of a plurality of hardware switches, and may be referred to as a global route update.

In response to receiving a global route update, or global route entry, the RCS stores the route in its global routing table, which is step 615 of the process.

Step 620 describes how a local route processor in the RCS is used to break down the global route update, which is stored in the global routing table, into next hop addresses that are associated with specific hardware switches that make up the virtual switch. The local route processor breaks down the global route update using a next hop map, wherein the next hop map stores a list of next hop addresses reachable from each hardware switch. In this step 620, the local route processor parses the global route update by searching for the hardware switch associated with a next hop address in the global route update.

Step 625 describes how the RCS, during the parsing operation on the global route update, stores next hops associated with specific hardware switches in local routing tables, where a local routing table is assigned to each hardware switch that makes up the combined virtual switch.

Step 630 is a check to see if the parsing operation on the global route update is complete, and wherein the process loops back to step 620 until all the next hops associated with a global route update have been assigned to a hardware switch in a local routing table.

Once the parsing operation is complete, the process proceeds to step 635, wherein the communication processor in the RCS is used to transmit local routing table information to the OFC. The OFC, at step 640, translates the local routing tables into flows which can be written to flow tables on individual hardware network nodes at step 645.

Figure 7:
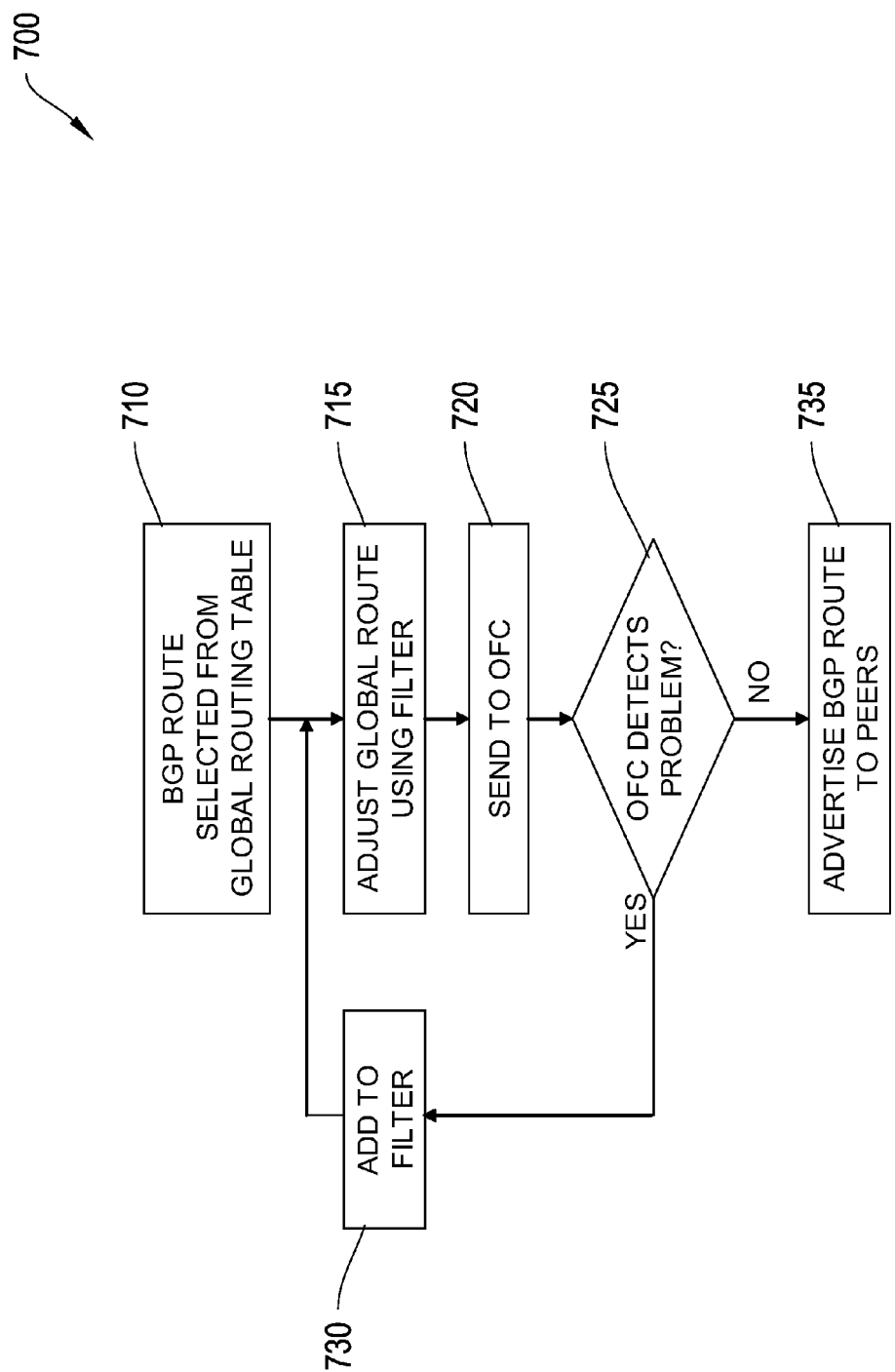
FIG. 7 is a flow chart diagram of a process for advertising a BGP route from the route control server.

FIG. 7 is a flow chart diagram of a process 700 for advertising a BGP route from the route control server. The process begins at step 710 as the BGP route is selected from the global routing table of the route control server (RCS), wherein the route selected considers the plurality of hardware switches attached to the OFC and RCS as a single virtual switch, which in turn, enables the RCS to communicate with a BGP network using less computational resources.

Step 715 refers to a filtering step that may be used to ensure that no routes advertised by the RCS using its BGP speaker will lead to black-holing, where black-holing refers to the advertisement of routes that are unreachable through some of the hardware switches that make up the combined virtual switch. The filter may store a list of network addresses that are reachable to some, but not all of the hardware switches that make up the virtual switch, and remove those routes from an advertisement which may lead to black holes.

Step 720 sends the advertised route to the OFC to be broadcasted to BGP peers, and step 725 checks whether the OFC detects a problem with the route that was not anticipated by the filter at step 715. If potential black-holing is detected, the hardware switch that may cause back-holing is added to the filter list at step 730, and the route is re-processed at step 715.

If there are no problems detected in the route to be advertised, the process proceeds to step 735, and the route is advertised to BGP peers.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Accordingly, it will be understood that the invention is not to be limited to the embodiments disclosed herein, but is to be understood from the following claims, which are to be interpreted as broadly as allowed under the law.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

What is claimed is:

1. A system for centrally-controlling network nodes, comprising:
    one or more computer processors configured as a centralized control server for exchanging control information with a plurality of individual network nodes in a network;
    a route control server, in communication with the centralized control server, configured to group the plurality of individual network nodes into a combined virtual network node, wherein the route control server maps individual ports on one or more edge nodes in the plurality of individual network nodes to corresponding virtual ports on the combined virtual network node, the mapped ports each linked to respective peer nodes external to the plurality of individual network nodes; and
    a single protocol processor configured to communicate between the combined virtual network node and a network peer using a routing protocol that advertises reachability information to the network peer, wherein the routing protocol advertises the combined virtual network node as a single network node with a number of virtual ports equal to a number of individual ports on the one or more edge nodes mapped to the virtual ports, wherein the protocol processor is a border gateway protocol (BGP) speaker.

2. The system according to claim 1, wherein the routing protocol is border gateway protocol (BGP).

3. The system according to claim 1, wherein the routing protocol is intermediate system to intermediate system (IS-IS) protocol.

4. The system according to claim 1, wherein the routing protocol is open shortest path first (OSPF) protocol.

5. The system according to claim 1, wherein the routing protocol is routing information protocol (RIP).

6. The system according to claim 1, wherein the routing protocol is address resolution protocol (ARP).

7. The system according to claim 1, further comprising;
    a global routing table in the route control server, wherein the global routing table stores routes associated with the combined virtual network node.

8. The system according to claim 1, further comprising;
a next hop map in the route control server, for storing a set of network addresses reachable from the plurality of individual network nodes.

9. The system according to claim 7, further comprising;
a local route processor, for extracting individual network node routes from the global routing table.

10. The system according to claim 9, further comprising;
a plurality of local routing tables in the route control server, wherein the local route processor stores routes extracted from the global routing table in a local routing table of a respective individual network node.

11. The system according to claim 1, wherein the route control server has a filter for storing a network address of a network peer that is unreachable from an individual network node, and for removing the individual network node from the combined virtual network node before communicating between the combined virtual network node and the network peer.

12. The system according to claim 1, wherein at least one of the individual network nodes is a network switch.

13. The system according to claim 1, wherein at least one of the individual network nodes is a network router.

14. The system according to claim 1, wherein the route control server includes a multiplexer to communicate with the centralized control server using a single transmission control protocol (TCP) session.

15. The system according to claim 1, wherein the centralized control server communicates with more than one route control server, and a route control server (RCS) table to decide which route control server should receive which packets.

16. A method for centrally-controlling network nodes, comprising;
exchanging, by a centralized control server, control information with a plurality of individual network nodes in a network;
grouping, by a route control server connected to the centralized control server, the plurality of individual network nodes into a combined virtual network node, wherein the route control server maps individual ports on one or more edge nodes in the plurality of individual network nodes to corresponding virtual ports on the combined virtual network node, the mapped ports each linked to respective peer nodes external to the plurality of individual network nodes; and
communicating, by a protocol processor, between the combined virtual network node and a network peer using a routing protocol that advertises reachability information to the network peer, wherein the routing protocol advertises the combined virtual network node as a single network node with a number of virtual ports equal to a number of individual ports on the one or more edge nodes mapped to the virtual ports, wherein the protocol processor is a border gateway protocol (BGP) speaker.

17. The method according to claim 16, wherein the routing protocol is border gateway protocol (BGP).

18. The method according to claim 16, wherein the routing protocol is intermediate system to intermediate system (IS-IS) protocol.

19. The method according to claim 16, wherein the routing protocol is open shortest path first (OSPF) protocol.

20. The method according to claim 16, wherein the routing protocol is routing information protocol (RIP).

21. The method according to claim 16, wherein the routing protocol is address resolution protocol (ARP).

22. The method according to claim 16, further comprising;
storing network routes associated with the combined virtual network node in a global routing table in the route control server.

23. The method according to claim 16, further comprising;
storing a set of network addresses reachable from the plurality of individual network nodes in a next hop map in the route control server.

24. The method according to claim 16, further comprising;
extracting, by a local route processor in the route control server, individual network node routes from the global routing table.

25. The method according to claim 16, further comprising;
storing network routes associated with the plurality of individual network nodes in respective local routing tables.

26. The method according to claim 16, further comprising;
communicating between the route control server and the centralized control server by multiplexing over a single transmission control protocol (TCP) session.

27. The method according to claim 16, further comprising;
storing, by a filter in the route control server, a network address of a border gateway protocol (BGP) network peer that is unreachable from an individual network node, and removing the individual network node from the combined virtual network node before communicating between the combined virtual network node and the BGP network peer.

* * * * *